Nov. 24, 1970 M. J. McMANUS 3,542,619
METHOD OF MOUNTING A WINDSCREEN OR WINDOW IN A SURROUNDING FLANGE
Filed Nov. 8, 1967
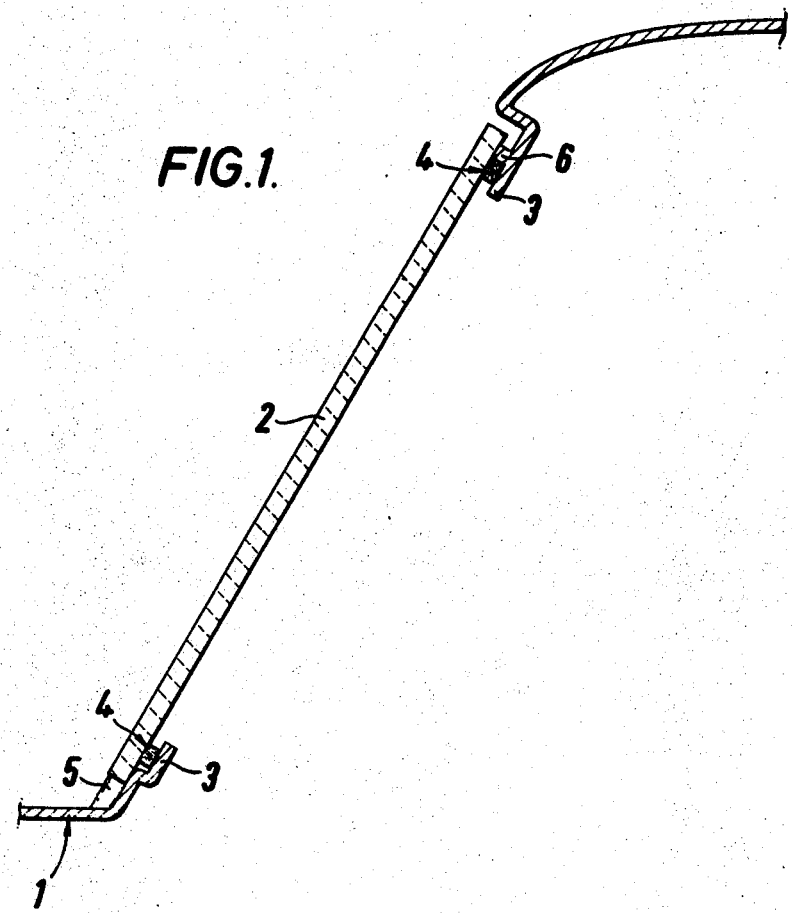
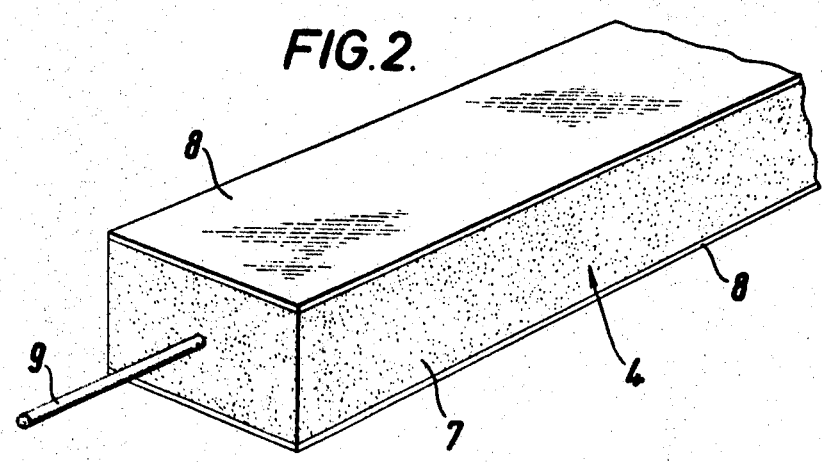
INVENTOR
MICHAEL JOHN McMANUS
BY
ATTORNEY

3,542,619
METHOD OF MOUNTING A WINDSCREEN OR WINDOW IN A SURROUNDING FLANGE

Michael John McManus, Coventry, England, assignor to Draftex Limited, Coventry, England, a British company
Filed Nov. 8, 1967, Ser. No. 681,324
Int. Cl. B29c 19/06
U.S. Cl. 156—275                    2 Claims

ABSTRACT OF THE DISCLOSURE

A method of mounting a member, for example a windscreen in a structure, for example a vehicle, wherein a flange is arranged to receive the member and overlaps the member and wherein a strip of thermoplastic material is applied to the flange and has embodied therein a heating element capable of softening the material such that the plastic material forms a bond with the member and flange.

---

This invention relates to the mounting of windscreens, windows, panels and the like particularly in vehicles, and has for its object to provide a method of mounting such windscreens and windows which is simple and economical and provides a secure fixing and an adequate seal around the windscreen or window to prevent the ingress of water.

According to the invention, a method of mounting a windscreen, window, panel or the like in a vehicle or other structure consists in providing a flange on the structure around the opening to receive the said windscreen or the like, which flange overlaps the edge of a windscreen or the like to be inserted in the opening, applying to the said flange, or to that portion of a surface of the windscreen or the like which overlaps the flange, a strip of thermoplastic material in which is embedded an electrical resistance wire or its equivalent, inserting the windscreen or the like in the opening, applying pressure to compress the strip of thermoplastic material between the flange and the windscreen or the like, and passing an electric current through the resistance wire to heat and soften the thermoplastic material, the thermoplastic material being such that it forms an adhesive bond with the windscreen or the like and with the flange.

Further, according to the invention, a mounting in a vehicle for a windscreen or window comprises a flange on the vehicle structure surrounding an opening in which the glass of the windscreen or window is inserted, and a strip of thermoplastic material placed between the said flange and the portion of a surface of the glass with which the flange overlaps and adhesively bonded to the said flange and glass, the said strip having embedded therein a resistance wire or its equivalent.

Preferably, the strip of thermoplastic material is formed of butyl rubber, but other thermoplastic materials capable of forming an adhesive bond with glass and metal may be used.

The thermoplastic material is not vulcanisable, but is heat treated thereby giving a carbon cross-link which imparts more heat stability and resistance to cold flow to the strip.

Referring to the accompanying drawings:

FIG. 1 is a vertical section showing the invention applied to the mounting of a vehicle windscreen;

FIG. 2 is a fragmentary perspective view of the attachment strip and its associated resistance wire drawn to an enlarged scale.

Referring in the first case to FIG. 1, the vehicle body is indicated generally by reference numeral 1, the body being formed with the usual rectangular opening for the windscreen 2. The opening is surrounded by a flange 3 which overlaps the edge of the windscreen, the flange being stepped or otherwise shaped to receive the attachment strip indicated generally by reference numeral 4.

The body pressing is formed with depressions forming local supports 5 for the windscreen and with ribs or the like 6 for locating the attachment strip at its upper end.

The attachment strip 4 shown in detail in FIG. 2 comprises a rectangular cross-sectional strip 7 of butyl rubber protected over two of its opposite faces with removable strips 8 of this thermoplastic material such as polythene, which are removed before the attachment strip is fitted.

A length of electrical resistance wire or the like 9 is moulded into the attachment strip, the ends of the wire projecting from the strip for connection with an electric battery or other source of electrical supply. The strip is preferably formed by an extrusion process, the extrusion being supplied in continuous lengths or cut to the required length for the particular vehicle to which it is to be fitted.

To mount the windscreen in position upon the vehicle, the thin polythene protecting strip is removed from one face of the attachment strip. The attachment strip may be first softened before mouning it in position, by connecting the ends of the resistance wire to a battery or other source of electrical supply. Alternatively the attachment strip may be first mounted on the vehicle and then softened, the windscreen being then pressed into position, the second polythene protecting strip having of course been removed. As a further alternative the attachment strip may be first of all applied to the windscreen.

The heating of the attachment strip causes softening of the butyl rubber which thus is caused to flow sufficiently to compensate for any irregularities of the surfaces of the flange and glass, allowing it to form a continuous bond with those surfaces around the whole periphery of the windscreen. After disconnection of the current supply the butyl rubber cools and returns substantially to its initial consistency.

Although it is found that butyl rubber is particularly suitable it is within the scope of the invention to employ any other suitable thermoplastic material.

The glass is thus secured in the opening by an adhesive bond and a complete seal is provided around its edge against the ingress of water or other liquids.

It will be evident that the method according to the invention can be applied to the mounting of windows in vehicles other than windscreens, and, in fact, may be used for mounting windows or panels or materials other than glass in openings or frames not only in vehicles but in other structures as well.

I claim:

1. A method of mounting a windscreen, window, or panel in position upon a supporting structure so that it closes an opening therein, consisting of providing a flange on the structure around the opening and projecting into the opening to form a support for the windscreen, window or panel, applying to the flange or to that portion of the windscreen, window or panel which overlaps the flange, a strip of thermoplastic material in which is embedded an electrical resistance wire, inserting the windscreen, window or panel in the opening so that the strip is sandwiched between the flange and the windscreen, window or panel, applying pressure to compress the strip and passing an electric current through the resistance wire to heat and soften the strip, the strip forming an adhesive bond with the windscreen, window or panel and the flange.

2. The method claimed in claim 1, wherein the attachment strip is first heated to soften it, then applied to the flange, windscreen, window or panel and finally subjected to pressure when sandwiched between the components to mould it into intimate contact and ensure a good bond.

References Cited

UNITED STATES PATENTS

| 2,647,072 | 7/1953 | Smith | 156—275 X |
| 2,662,045 | 12/1953 | Baggott | 156—275 X |

CARL D. QUARFORTH, Primary Examiner

S. J. LECHERT, JR., Assistant Examiner

U.S. Cl. X.R.

52—746; 156—242, 293, 295, 320